UNITED STATES PATENT OFFICE.

HENRY ROBERT ANGEL, OF LONDON, ENGLAND, ASSIGNOR OF ONE-HALF TO CHARLES HENRY THOMPSON, OF SAME PLACE.

EXTRACTION OF LEAD FROM ITS ORES.

SPECIFICATION forming part of Letters Patent No. 599,310, dated February 22, 1898.

Application filed May 22, 1897. Serial No. 637,739. (No specimens.)

*To all whom it may concern:*

Be it known that I, HENRY ROBERT ANGEL, ship-owner, a subject of the Queen of Great Britain, residing at 7 St. Helen's Place, in the city of London, England, have invented Improvements in the Extraction of Lead with other Metals from its Ores, of which the following is a specification.

According to this invention zinc-blende or other sulfid ores of lead are mixed and heated with sulfate of soda (or it might be bisulfate of soda, sulfate of potash, or the like) and carbonaceous matter, preferably small coal.

Preferably the process is carried out as follows: The ore is thoroughly calcined and four to six parts, by weight, are then intimately mixed with two parts of sulfate of soda and one part of small coal, the materials being first reduced to a granular condition. The mixture is then fused in a Siemens open-hearth gas-furnace, care being taken that the flame does not come into contact with the charge, and the lead containing the greater part of the silver and gold is tapped out, the volatile metals, such as zinc, being collected in chambers. The remainder of the gold and silver are recovered by adding galena to the molten slag, or the whole charge may be drawn from the furnace and cooled, the metals being separated from the slag by ordinary methods.

In place of mixing all three ingredients together before heating them the sulfate of soda and the coal may first be heated and rabbled together until they burn into a flame and assume a red-hot granular condition, whereupon the calcined ore, which has been separately heated, is added and the mixture rabbled under a moderate heat. By this means the process can be carried on at a lower temperature, but more labor is required.

It is not essential that the ore should be thoroughly calcined. Uncalcined or imperfectly calcined ore may be employed; but in this case sufficient oxid of zinc—say one-fifth of the weight of the ore—should be added to carry off the sulfur. This oxid of zinc may be used over and over again as it is deposited in that form in the furnace-flue.

I claim—

1. The process of extracting lead with other metals from its ores, consisting in mixing and heating the ore with an alkali metal sulfate and carbonaceous matter in substantially the proportions specified; viz., four to six parts by weight of ore to two parts of alkali metal sulfate, and one part of carbonaceous matter.

2. The process of extracting lead with other metals from its ores, consisting in mixing and heating the ore with an alkali metal sulfate, carbonaceous matter and oxid of zinc.

3. The process of extracting lead with other metals from its ores, consisting in mixing and heating the ore with an alkali metal sulfate, carbonaceous matter and oxid of zinc in substantially the proportions specified; viz., ore, four to six parts by weight; alkali metal sulfate, two parts; carbonaceous matter, one part; oxid of zinc, one-fifth of the weight of the ore.

4. The process of extracting lead with other metals from its ores, consisting in mixing and heating an alkali metal sulfate with carbonaceous matter, and then mixing and heating the mixture with the ore in substantially the proportions specified; viz., ore, four to six parts, by weight; alkali metal sulfate, two parts, and carbonaceous matter, one part.

5. The process of extracting lead with other metals from its ores, consisting in mixing and heating an alkali metal sulfate with carbonaceous matter, and then mixing and heating the mixture with the ore and oxid of zinc.

6. The process of extracting lead with other metals from its ores, consisting in mixing and heating an alkali metal sulfate with carbonaceous matter and mixing and heating the mixture with the ore and oxid of zinc in substantially the proportions specified; viz., ore, four to six parts, by weight; alkali metal sulfate, two parts; carbonaceous matter, one part; oxid of zinc, one-fifth of the weight of the ore.

HENRY ROBERT ANGEL.

Witnesses:
ROBERT B. RANSFORD,
WALTER J. SKERTEN.